Jan. 26, 1965     H. M. LARRICK ETAL     3,167,755
MONITOR CIRCUITS FOR DETECTION AND ALARM SYSTEMS
Filed Feb. 11, 1963
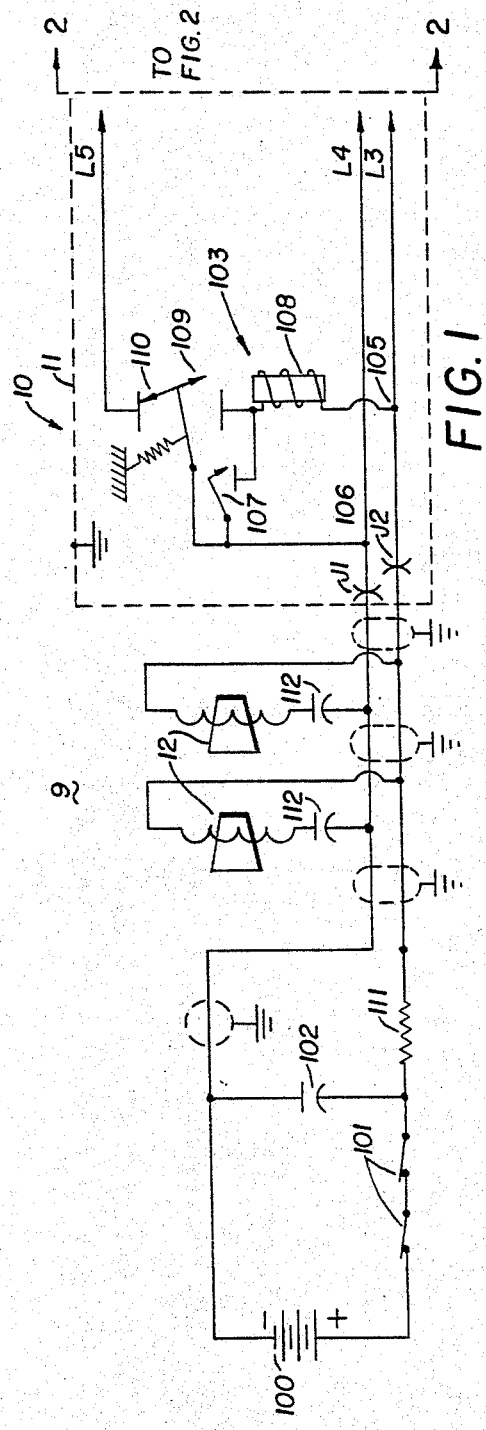
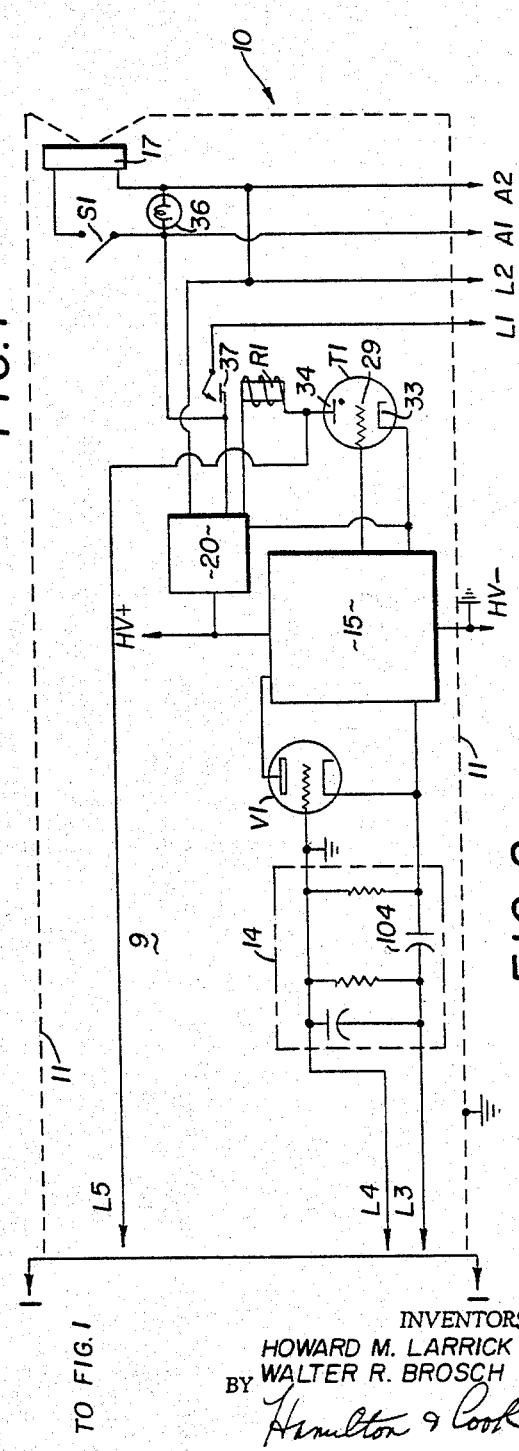
INVENTORS
HOWARD M. LARRICK &
BY WALTER R. BROSCH
Hamilton & Cook
ATTORNEYS

United States Patent Office 3,167,755
Patented Jan. 26, 1965

3,167,755
MONITOR CIRCUITS FOR DETECTION AND
ALARM SYSTEMS
Howard M. Larrick, 3105 Harvard Ave. NW., Canton,
Ohio, and Walter R. Brosch, 2032 Grogg Road, Akron,
Ohio
Filed Feb. 11, 1963, Ser. No. 257,606
3 Claims. (Cl. 340—261)

The present invention relates generally to detection and alarm systems. More particularly, the present invention relates to burglar alarm systems which are actuated by sounds, vibrations, or other phenomena indicating unauthorized intrusions or disturbances within an area under surveillance. Specifically, the present invention relates to a protective or monitor circuit which is capable of detecting unauthorized tampering with the elements of the alarm system.

Detection and alarm systems, for which the present invention is peculiarly well adapted, commonly include inferentially or indirectly actuated devices, such as microphones, for sensing, indirectly, noises or disturbances created by burglars or other intruders. The provision of tamper-proof and fail-safe features in such systems is of paramount importance in achieving the necessary degree of reliability and sensitivity of detection. Moreover, an automatic monitor system which constantly polices the operation of the alarm system itself provides a further advantage in terms of a reduction in the number of watchmen or other personnel required to guard the alarm system.

A particular source of trouble exists with the transmission lines connecting the sensor devices with the amplifier and alarm devices. Burglars or other intruders have found it possible to measure the electrical parameters of these lines, duplicate these parameters with shunting elements, and sever the lines, thereby disconnecting and nullifying the alarm devices.

In attempting to solve this problem, certain prior art methods have contemplated the use of elaborate and complex transmission line networks to produce transmission line impedance characteristics which would be difficult to match with sufficient precision. However, such methods are not only too expensive to be practical, but are also unsuitable in that the system is rendered too sensitive and susceptible to false triggering. Other methods proposed include variants on push-to-test circuitry, but these methods possess the obvious disadvantage of requiring constant personal attention. Still other systems have been proposed wherein elaborate radio frequency bridge circuits are employed in which the intruder's body acts as a variable antenna. Again, the systems are too expensive, sensitive and unstable for practical application.

One of the most recent proposals has involved use of a protective system wherein a high frequency supervisory signal is impressed on the alarm system by oscillator circuitry. A plurality of current detection relays are used in conjunction with the oscillator circuitry to detect disturbances. Aside from the fact that such accessory systems add considerably to the expense of the alarm system, the circuitry is notoriously unstable and produces unreliability in terms of false triggering and the requirement for constant sensitivity adjustment. Furthermore, the system is readily nullified by the aforementioned method of shunting the transmission lines with equivalent parameter elements, known as the characteristic impedance, and thereafter severing the pickup or detection circuit from the alarm circuit.

It is therefore an object of the present invention to provide a detection and alarm system capable of detecting unauthorized tampering in the circuitry thereof.

It is another object of the present invention to provide a simple, inexpensive protective or monitor circuit to directly detect tampering, intrusions, or maintenance failures in the alarm system with a high degree of reliability.

It is a further object of the present invention to provide an improved monitor circuit which will detect an attempt to duplicate the parameters of the transmission lines it is protecting.

It is a still further object of the present invention to provide an improved monitor circuit whereby existing detection and alarm systems may be modified to incorporate tamper-proof and fail-safe features.

These and other objects, which will become apparent from the following specification, are accomplished by means hereinafter described and claimed.

One preferred embodiment of the present invention is shown by way of example in the accompanying drawing, and is described hereinafter in detail, without attempting to show all of the various modifications by which the invention might be practiced, the invention being measured solely by the appended claims.

The drawing is a schematic wiring diagram of a monitor, or protective, circuit for a detection and alarm system according to the present invention, with FIG. 2 being a continuation of the circuit shown in FIG. 1.

In general, a detection and alarm system, according to the present invention, comprises a plurality of inferential transducers and direct sensors to detect intrusion noises and disturbances, amplifying means to increase the detection sensitivity and provide desired controls, signalling or alarm devices actuated by said amplifying means, monitor signal means to superimpose a monitor voltage on the sensor and transducer circuits, and monitor signal sensing means for detecting unauthorized tampering with the system and actuating the signalling and alarm devices.

In the preferred embodiment shown in the schematic wiring diagram the system is indicated generally by the numeral 9 and includes amplifying and control means 10 within a grounded housing 11, indicated by dashed lines. Referring particularly to FIG. 1, shielded pickup lead wires L3 and L4 extend outwardly from the housing 11 into the area to be protected. The shields of leads L3 and L4 are shown as being grounded to drain off spurious signals which might be produced thereon by antenna effects.

A plurality of inferential (i.e., inferentially or indirectly actuated) transducers, here shown as induction speakers 12 functioning as microphones, are connected in parallel to the leads L3 and L4 in a manner more fully discussed below. Although in the preferred embodiment the transducers are speakers, other suitable transducers, such as infra-red receivers, variable capacitance heads, or mutual inductance pickups, could be employed as desired, requiring only minor variations in circuitry to transfer the frequency input to the necessary audio range for operation of the amplifier and control circuitry. Such devices could be used either as replacements for the speakers 12, or, by simple parallel connection to lines L3 and L4 at plug-in jacks J1 and J2, different types of transducers could be utilized to supplement the speakers 12.

The speakers 12 function as sound transducers to detect pressure or sound wave variations within the surveillance area. Variations in sound wave intensity would signify intruder noise or other disturbances, and the speakers or transducers 12 will transform this sound energy into electrical signals or information. These signals are then transmitted to the amplifier and control means 10 through leads L3 and L4 and are impressed upon the cathode biasing network 14, shown within chain lines in FIG. 2. This biasing signal triggers the first vacuum triode V1 of a grounded grid amplifier designated generally by the number 15. Any suitable multi-stage, cascaded amplifier may be employed in this part of the system. For example, the amplifier circuitry disclosed in applicants' U.S. Patent No. 3,049,699 might be used. And, if it is desired to discriminate between sporadic environmental noises, such as train whistles, street sounds, and the like, an automatic sensitvity control may be incorporated into the amplifier circuitry such as the control disclosed in applicants' copending U.S. application Serial No. 202,763, filed June 15, 1962 now U.S. Patent No. 3,155,954. Furthermore, the triode V1 may be replaced by a suitable transistor having base, collector, and emitter connections corresponding to the grid, anode, and cathode connections depicted as V1. Similarly, the other elements of the amplifier 15 may be transistorized, if desired.

The amplifier circuit 15 is connected to a direct current plate voltage supply as indicated by leads HV in FIG. 2. The negative lead of the plate voltage supply HV is preferably grounded for reasons discussed below.

The last stage of the amplifier 15 is connected to a gas discharge tube T1 of the thyratron type with the thyratron biasing network 20 preferably embodying time-delay, automatic reset circuitry as disclosed in the aforementioned U.S. Patent No. 3,049,699. In general, the thyratron T1 functions as an on-off switch for the alarm circuitry. The cathode 33 and control grid 29 are connected into the amplifier 15 and thyratron biasing network 20 so that during normal operating conditions, when no intrusion noises or disturbances are being detected by the transducers or speakers 12, the thyratron biasing network 20 establishes a blocking voltage between grid 29 and cathode 33 sufficient to prevent firing of the thyratron T1. When an intrusion noise is picked up by the speakers 12, it is transmitted through leads L3 and L4 to the amplifier 15, where it is amplified to a level sufficient to reduce the thyratron blocking bias voltage to the firing point of the tube T1. Thereafter, the gas within the tube ionizes, providing a low resistance current path between cathode 33 and anode 34 and the control grid 29 loses control over the current flow through the tube. From the foregoing description it will be apparent that, if desired, the thyratron may be replaced with any suitable equivalent, as, for example, a magnetic amplifier or silicon controlled rectifier.

Once the thyratron T1 has fired, a circuit is established through the coil of plate relay R1, the biasing network 20, and back through thyratron T1 to the relay coil R1. Since the biasing network 20 is connected to the positive plate voltage lead HV, the relay coil R1 will have impressed upon it a voltage equal to the plate supply voltage at HV less the voltage drops through the network 20 and the tube T1. This voltage, approximately 95 volts in the preferred circuitry, is of sufficient magnitude to actuate relay coil R1 to close associated contact 37 which is normally open when the relay R1 is de-energized.

The closing of contact 37 connects the power supply lines L1 and L2 (i.e., 110 volt, 60 cycle) to the alarm circuit lines A1 and A2, thereby actuating audio speaker 17 (if toggle switch S1 is closed), lamp 36, and any other signalling devices which may be connected to leads A1 and A2. The closing of contact 37 also feeds power to a thermal time delay relay in biasing network 20 so that the thyratron circuit is opened and reset after a predetermined time interval.

Referring to FIG. 1, the novel protective or monitor circuit includes a dry-cell battery or other suitable D.C. voltage source 100 terminating the parallel transmission lines L3 and L4. A plurality of directly actuated or direct sensor devices 101, such as microswitches or window casement tapes, may be connected in series with the battery 100, with a capacitor 102 shunting the battery 100 and direct sensors 101. Lines L3 and L4, which are shielded from this point, extend into the grounded enclosure 11 of the amplifying and control means 10 wherein D.C. undervoltage sensing means, such as undervoltage relay 103, are connected in parallel with lines L3 and L4. Lines L3 and L4 are then coupled to tube V1 in the first stage of amplifier 15 through a filtering and biasing network 14 which includes a coupling capacitor 104 to present an open-circuit to the D.C. monitor voltage of battery 100, thereby isolating the D.C. monitor signal from the audio amplifier circuit 15.

In operation, this circuitry provides a D.C. monitor voltage which is superimposed upon any audio signals from transducers 12. Under conditions of normal operation, this superimposed monitor voltage, which in the present case is 1.5 volts, is presented across the undervoltage relay 103 at terminals 105 and 106 in lines L3 and L4 respectively. The monitor circuit is turned on by depressing and closing the normally-open, momentary-contact reset switch 107 thereby impressing the D.C. monitor voltage across the hyper-sensitive coil 108 of the undervoltage relay 103. The coil 108, thus energized, pulls in and closes undervoltage relay contact 109 which is normally open when the relay is de-energized. Simultaneously contact 110, which is mechanically linked with contact 109 and is normally closed when the relay is de-energized, is opened. Hence, the undervoltage relay coil 108 is maintained energized across the lines L3 and L4 at all times during which the monitor voltage at terminals 105 and 106 is of precisely the proper magnitude (i.e., 1.5 volts).

A drop or transient variation of monitor voltage at terminals 105 and 106 will produce a corresponding change in the hold-in flux produced by the coil 108, thereby opening contact 109 and closing contact 110. The closing of contact 110 connects line L5 with line L4 which is grounded at the grid of V1, as shown in FIG. 2. The other end of line L5 is connected to plate 34 of thyratron T1 and thus to one side of plate relay coil R1. Thus, a circuit is made up across the coil R1 from the plate voltage supply lead HV+, through the coil R1, through leads L5 and L4 to ground and back through the grounded plate voltage supply lead HV—. This presents a voltage across R1 (e.g., 180 volts) and causes closure of contact 37, thereby actuating the alarm circuits. Hence, the alarm system is actuated not only by noises or disturbances which are detected by the inferential transducers 12; but also, by direct disturbances to the circuitry itself which are reflected in variations in the monitor voltage.

Disturbances in the monitor voltage would correspond to one of three situations: some maintenance failure has occurred; a direct sensor 101 has been severed or opened, signifying intrusion; or, some tampering has been attempted upon the elements of the monitor circuit. In all three instances, the loss or transient variation in voltage across undervoltage relay coil 108 will cause actuation of the alarm devices.

Thus, not only is the system rendered virtually foolproof in detection of instrusion disturbances in the surveillance area; but, moreover, any unauthorized tampering in an attempt to short or sever lines L3 and L4, or to match the line impedance (e.g., with a Wheatstone bridge) prior to severing, will produce monitor voltage variations sufficient to cause actuation of the alarm device.

The preferred embodiment of the novel monitor circuit also includes additional features which provide advantages in operation. The shunting capacitor 102 provides a radio frequency bleed-off path for spurious signals picked up by antenna effect in the unshielded direct sensor circuits 101. A capacitance value of 50 microfarads has been found suitable for this purpose. If desired, a resistor 111 may be connected in series with the monitor voltage source 100, thereby preventing excessive current drain on the dry cell batteries and providing longer life. For example, with an undervoltage relay coil with 300 ohms resistance and a hold-in voltage rating of 1.5 volts, a resistor of 150 ohms should be connected in series with a 3.0 volt battery. An even more important function of the resistor 111 is to provide a high impedance series parameter for blocking and isolating the a.c. or audio signal from the monitor or protective circuit and low impedance battery or monitor signal source 100. The monitor relay coil 108 presents a high inductive impedance to the audio frequency signals from the speaker 12. Therefore, the monitor signal sensing means 103 remain unaffected by variations in the audio signals from the inferential transducers. Finally, isolating capacitors 112 should be connected in series with speakers 12 or other inferential transducer devices to present an open-circuit to the d.c. monitor voltage, and thereby prevent deleterious effects created in the transducers by circulating direct current.

It is therefore apparent that a monitor circuit embodying the above disclosed concept accomplishes the objects of the invention.

What is claimed is:

1. A burglar detection and alarm system comprising; a plurality of transducer devices, a pair of transmission lines having first and second ends and connecting said transducer devices in parallel with each other, each said transducer device being connected across said transmission lines through an isolating capacitor, a direct current monitor voltage source connected across the first end of said transmission lines to superimpose a monitor signal thereon, an amplifier having an input and output, an alarm control circuit connected to the output of said amplifier and having a trigger relay, a coupling element connecting the second end of said transmission lines to the input of said amplifier for conducting signals to said amplifier from said transducer devices while isolating said monitor signal from said amplifier, and an undervoltage relay connected across said transmission lines between said transducer devices and said coupling element, said relay having a contact normally closed when said relay is de-energized to bypass said amplifier and alarm control circuit by connecting said amplifier input to said trigger relay, thereby actuating said trigger relay upon variation in said monitor signal.

2. A burglar detection and alarm system comprising; a plurality of transducer devices, a pair of shielded transmission lines having first and second ends and connecting said transducer devices in parallel with each other, each said transducer device being connected across said transmission lines through an isolating capacitor, a direct current monitor voltage source connected across the first end of said transmission lines to superimpose a monitor signal thereon, an amplifier having an input and output, an alarm control circuit connected to the output of said amplifier and having a trigger relay, a coupling element connecting the second end of said transmission lines to the input of said amplifier for conducting audio signals to said amplifier from said transducer devices while isolating said monitor signal from said amplifier, and an undervoltage relay connected across said transmission lines between said transducer devices and said coupling element, said relay having a contact normally closed when said relay is de-energized to bypass said amplifier and alarm control circuit by connecting said amplifier input to said trigger relay, thereby actuating said trigger relay upon variation in said monitor signal.

3. A burglar detection and alarm system comprising; a plurality of sound pickup devices, a pair of shielded transmission lines having first and second ends and connecting said sound pickup devices in parallel with each other, each said sound pickup device being connected across said transmission lines through an isolating capacitor, a direct current monitor voltage source connected across the first end of said transmission lines to superimpose a monitor signal thereon, an amplifier having an input and output, an alarm control circuit connected to the output of said amplifier and having a trigger relay, a coupling element connecting the second end of said transmission lines to the input of said amplifier for conducting audio signals to said amplifier from said sound pickup devices while isolating said monitor signal from said amplifier, and an undervoltage relay connected across said transmission lines between said sound pickup devices and said coupling element, said relay having a contact normally closed when said relay is de-energized to bypass said amplifier and alarm control circuit by connecting said amplifier input to said trigger relay, thereby actuating said trigger relay upon variation in said monitor signal.

References Cited by the Examiner
UNITED STATES PATENTS

| | | | |
|---|---|---|---|
| 1,547,873 | 7/25 | Hopkins | 340—261 |
| 1,684,032 | 9/28 | Joron | 179—5 |
| 2,435,996 | 2/48 | Baird | 340—258 |
| 2,709,251 | 5/55 | Schmidt | 340—258 |
| 2,942,247 | 6/60 | Lineau et al. | 340—258 |
| 3,009,137 | 11/61 | Cassell | 340—261 |
| 3,010,100 | 11/61 | Muehter | 340—276 |
| 3,069,673 | 12/62 | Ward et al. | 340—276 |

FOREIGN PATENTS 642,758  9/28  France.

NEIL C. READ, *Primary Examiner.*